United States Patent [19]

Kurita

[11] Patent Number: 5,725,240
[45] Date of Patent: Mar. 10, 1998

[54] AIR BAG MODULE

[75] Inventor: Kenji Kurita, Kanagawa, Japan

[73] Assignee: NSK Ltd., Tokyo, Japan

[21] Appl. No.: 534,993

[22] Filed: Sep. 27, 1995

[30] Foreign Application Priority Data

Sep. 29, 1994 [JP] Japan ............................ 6-235218

[51] Int. Cl.$^6$ .................................................. B60R 21/16
[52] U.S. Cl. ............................... 280/728.2; 280/728.3
[58] Field of Search ......................... 280/728.1, 728.2, 280/728.3, 731, 732

[56] References Cited

U.S. PATENT DOCUMENTS 5,167,427  12/1992  Baba .
5,312,129   5/1994  Ogawa .
5,427,407   6/1995  Yokote .

FOREIGN PATENT DOCUMENTS 1-160756  6/1989  Japan .
6-8118    2/1994  Japan .

*Primary Examiner*—Paul N. Dickson
*Attorney, Agent, or Firm*—Evenson, McKeown, Edwards & Lenahan, P.L.L.C.

[57] ABSTRACT

An air bag module comprises a housing for being mounted on a vehicle body and a cover fixedly secured on the housing. The housing has a base plate portion and a support plate portion bent down from the base plate portion. The support plate portion is provided with engagement holes. The cover has a cover portion having dimensions sufficient to cover the base plate portion of said housing, a substantially-cylindrical mounting plate portion extending from the cover portion toward the housing and located outside the support plate portion, short cylindrical convexities maintained in engagement with the engagement holes, and indentations formed in the mounting plate portion at plural locations spaced from each other in a peripheral direction of the mounting plate portion. The short cylindrical convexities are formed on the mounting plate portion and are located on a single plane extending across a direction in which the cylindrical mounting plate portion extends. Deepest portions of the indentations are substantially coincided with the single plane.

5 Claims, 10 Drawing Sheets

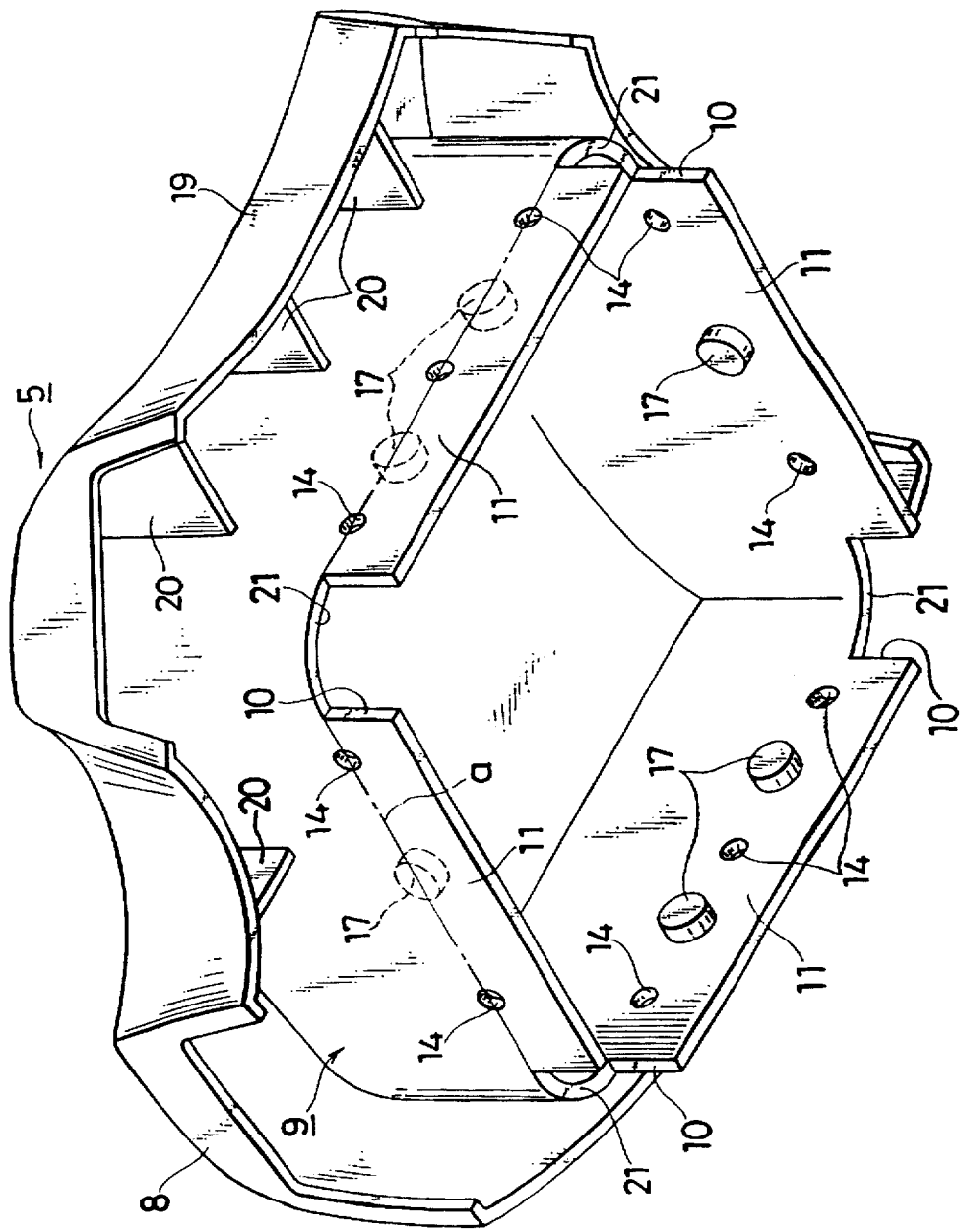

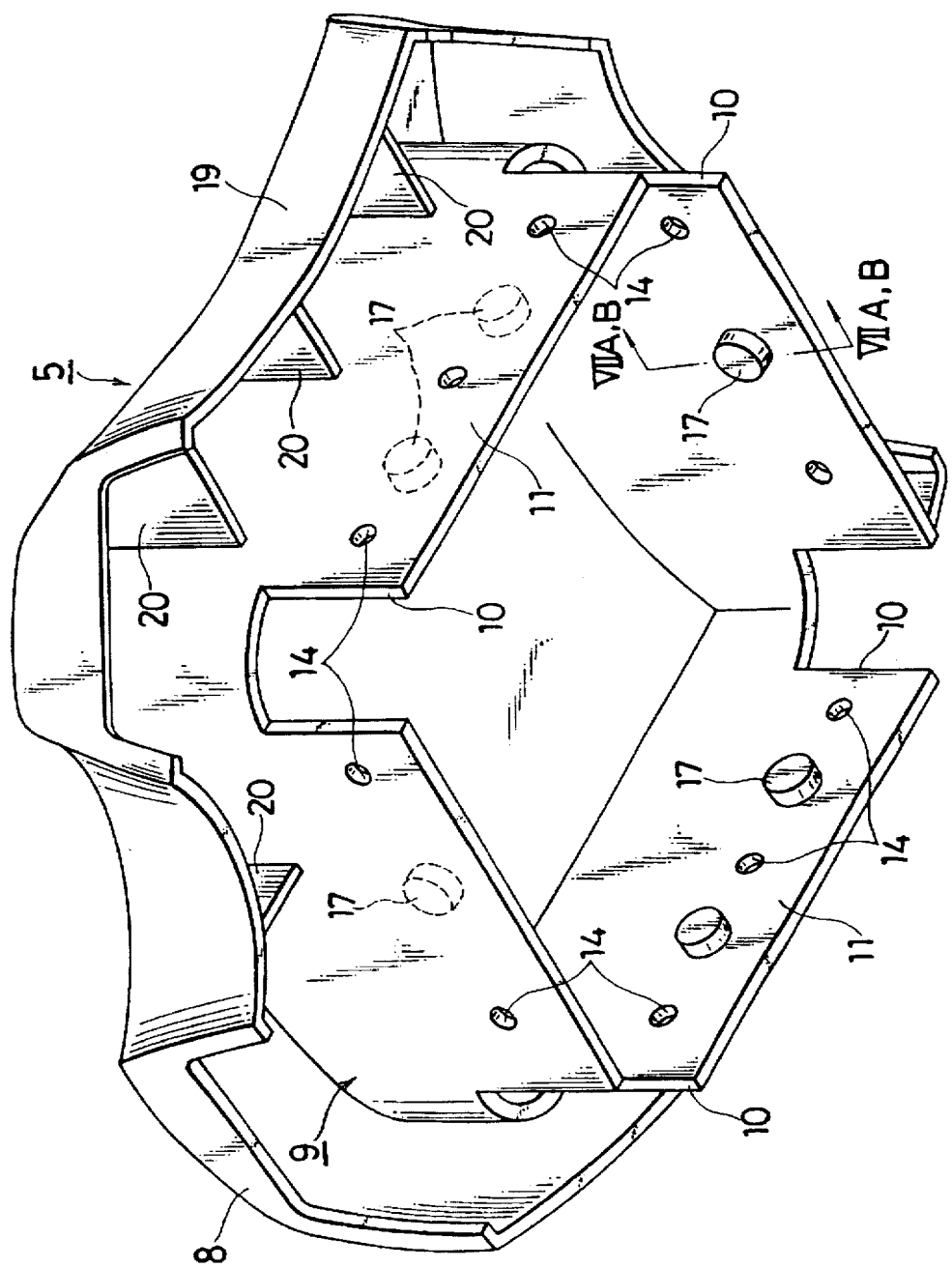

5,725,240

1

AIR BAG MODULE

BACKGROUND OF THE INVENTION a) Field of the Invention

This invention relates to an air bag module which is mounted, for example, in a central part of a steering wheel to protect a passenger such as a driver upon a collision accident.

b) Description of the Related Art

In the event of a collision accident, the so-called primary collision that an automotive vehicle collides with another automotive vehicle or the like is followed by occurrence of the so-called secondary collision that an occupant such as a driver hits the steering wheel. With a view to reducing an impact exerted on the driver's body at the time of the secondary collision and hence protecting the driver, air bag systems are finding increasing utility.

An air bag system promptly inflates a bag in the event of a collision accident and supports the body of an occupant by the inflated body. Known air bag systems include, for example, those disclosed in Japanese Patent Application Laid-Open (Kokai) No. HEI 1-160756, U.S. Pat. No. 5,167,427, U.S. Pat. No. 5,312,129 and Japanese Utility Model Application Laid-Open (Kokai) No. HEI 6-8118. FIGS. 4 to 5 illustrates an air bag module which constitutes an air bag system disclosed in U.S. Pat. No. 5,312,129 out of such conventionally known air bag systems. The air bag module, which is illustrated in FIGS. 4 to 5 and identified by numeral 1, is mounted in a central part of a rear face of a steering wheel to protect a driver in the event of a collision accident.

This air bag module 1 is constructed of a housing 2 for being fixed on an unillustrated steering wheel, an inflator 3 for blowing out high-pressure gas such as nitrogen gas upon occurrence of a collision accident, said inflator 3 being supported and fixed in a central part of the housing 2, an air bag 4 for being inflated by the high-pressure gas in the event of the collision accident, said air bag 4 being supported in a folded form on the housing 2, and a cover 5 normally extending over the air bag 4.

Upon occurrence of a collision accident, the inflator 3 blows out high-pressure gas responsive to a signal from an unillustrated impact detection sensor so that the air bag is promptly inflated. At this time, the cover is torn at a thin wall portion, thereby allowing the air bag 4 to pop out of the cover 5. As a result, the air bag 4 is allowed to inflate on a rear side (on a driver side) of the steering wheel and supports the driver's body.

The cover 5 of such a construction as described above is fastened and fixed on peripheral edge portions of the housing 2 by means of holding plates 6 and rivets 7. This cover 5 has been formed by molding its entirety into an integral unit with a synthetic resin such as polyvinyl chloride, and is provided with a cover portion 8 of dimensions sufficient to cover the housing 2 and also with a mounting plate portion 9 arranged on an inner wall of the cover portion 8 and extending out from the cover portion 8. In the construction shown in FIG. 4, indentations 10 are formed at four corners of the mounting plate portion 9. As shown in FIG. 6 by way of example, the indentations 10 extend close to an inner wall of the cover portion 8. Accordingly, a half portion of the mounting plate portion 9, said half portion being on a side of a free edge of the mounting plate portion 9, includes four flat plate portions 11 which are separated from each other in a peripheral direction. The thin wall portion is defined by one or more grooves formed in an inner wall of the cover portion 8.

2

On the other hand, the housing 2 has been produced in the form of a parallelepiped by press-forming a metal plate such as a steel plate and has a rectangular base plate portion 12 and a short cylindrical support plate portion 13 pendant from a peripheral edge portion of the base plate portion 12. The inflator 3 is fixed by screws or the like on a central part of the base plate portion 12. An end portion of the air bag 4, where an opening of the air bag 4 is defined, is secured on the base plate portion 12 so that the inflator 3 is surrounded by the end portion of the air bag 4. The air bag 4 is stacked in a folded state on the base plate portion 12 and is enclosed by the cover 5.

To fasten and fix the cover 5 to the housing 2, the flat plate parts 11 are placed between an outer peripheral wall of the support plate portion 13 and the holding plates 6 and the holding plates 6 are then fastened by the rivets 7 to the support plate portion 13. For this purpose, plural holes 14,15,16 are formed through the holding plates 6, the flat plate portions 11 and the support plate portion 13, respectively, at mutually-aligned positions. Each rivet 7 is clinched or crimped at a free end portion thereof in the state that the rivet 7 extends through its corresponding holes 14,15,16, whereby the holding plates 6, the flat plate portions 11 and the support plate portion 13 are joined together.

To facilitate the work that the rivets 7 are inserted through the holes 14,15,16 to secure the cover 5 on the housing 2 as described above, concave-convex engagement portions are arranged between inner walls of the flat plate portions 11 and the outer peripheral wall of the support plate portion 13. These concave-convex engagement portions are so designed that upon engagement of the concave-convex engagement portions, the holes 14,15 which are formed through the flat plate portions 11 and the support plate portion 14, respectively, align with each other. Described specifically, short cylindrical convexities 17 are formed at plural positions on the inner walls of the respective flat plate portions 11, whereas engagement holes 18 in which the corresponding short cylindrical convexities 17 can be fitted are formed through the support plate portion 13.

To secure the cover 5 on the housing 2, the mounting plate portion 9 is first externally fitted on the support plate portion 13 so that the respective flat plate portions 11 which make up the mounting plate portion 9 are brought into contact with the inner walls of the flat plate portions 11 and the outer peripheral wall of the support plate portion 13. Concurrently with this, the individual short cylindrical convexities formed on the inner walls of the flat plate portions 11 are caused to fit in the corresponding engagement holes 18 formed through the support plate portion 13.

In other words, with the inner wall of the cover portion 8 of the cover 5 positioned opposite one side of the base plate portion 12 of the housing 2, said one side being on the side on which the inflator 3 and the air bag 4 are mounted, free edge portions of the flat plate portions 11 which make up the mounting plate portion 9 are externally fitted on the support plate portion 13 as illustrated in FIG. 7A. The cover 5 is then strongly pushed toward the housing 2 so that, as depicted in FIG. 7B, the short cylindrical convexities 17 are caused to ride on the outer peripheral wall of the support plate portion 13. By further pushing the cover 5 toward the housing 2, the short cylindrical convexities 17 are caused to fit in the corresponding engagement holes 18. Once the individual short cylindrical convexities 17 have been caused to fit in the corresponding engagement holes 18 as described above, the holes 14 formed through the respective flat plate portion 11 and the corresponding holes 15 formed through the support plate portion 13 are aligned and maintain the thus-aligned relationship as illustrated in FIG. 5. As a consequence, the work that the holes formed through the holding plates 6 are aligned with the corresponding holes 14,15 and the rivets 7 are inserted through the respective holes 14,15,16 can be performed with ease. When the air bag module is assembled actually, the inflator 3 and the air bag 4 are mounted on the housing 2, followed by the assembly of the cover 5 with the housing 2 so that the inflator 3 and the air bag 4 are enclosed by the cover 5.

Regarding the shape of the cover 5, Japanese Patent Application Laid-Open (Kokai) No. HEI 1-160756, U.S. Pat. No. 5,312,129, Japanese Utility Model Application Laid-Open (Kokai) No. HEI 6-8118 disclose, as shown in FIG. 6, a cover with deep indentations 10 formed in a mounting plate portion 9. On the other hand, U.S. Pat. No. 5,167,427 discloses, as depicted in FIG. 8, a cover 5 without such indentations in a mounting plate portion 9. To mount on the housing 2 the cover 5 free of such indentations in the mounting plate portion 9, the cover 5 is assembled with the housing in the same manner as the cover 5 having the indentations 10. It is to be noted that the basic shapes of the covers 5 shown in FIGS. 6 and 8 are not the same as those exactly disclosed in the above patent and utility model publications because the covers 5 in FIGS. 6 and 8 have been illustrated in conformity with the embodiments of the present invention. In other words, FIGS. 6 and 8 are intended to show the conventional art in the area of the mounting plate portion 9. However, the shape of the covers 5 in the area of the cover portion 8 and the reinforcement ribs 20 depicted in FIGS. 6 and 8 were by themselves not known conventionally.

The conventional air bag module covers however develop such problems as will be described next. First, in the case of the cover 5 with the deep indentations 10 formed in the mounting plate portion 9 as illustrated in FIG. 6, flat plate portions 11 have low stiffness so that short cylindrical convexities 17 formed on an inner peripheral wall of the respective flat plate portions 11 and their corresponding engagement holes 18 (see FIGS. 3 to 4) formed on the support plate portion 14 of the housing 2 are prone to disengagement.

Namely, the work that the mounting plate portion 9 is caused to externally fit on the support plate portion 13 is performed after mounting the air bag 4 on the housing 2. Peripheral edges of the folded air bag 4 therefore push the mounting plate portion 9 outwardly. If the flat plate portions 11 which make up the mounting plate portion 9 have sufficient stiffness, these flat plate portions 11 are not deformed outwardly as shown in FIG. 9A so that the short cylindrical convexities 17 are not caused to slip out of the corresponding engagement holes 18. Accordingly, the insertion work of the rivets 7 (see FIGS. 3 to 4), said insertion work being to be performed next, will not be hampered.

If the stiffness of the flat plate portions 11 is low, problems arise. This will hereinafter be explained by dividing the situation into two cases depending on the degree of stiffness. Where the stiffness is substantially low, each flat plate portion 11 is pushed and deformed outwardly by the air bag 4 so that each short cylindrical convexity 17 cannot reach its corresponding engagement hole 18, as shown in FIG. 9B. Next, where the stiffness is not so low as described above but is still insufficient, each short cylindrical convexity 17 may be caused to fit in its corresponding engagement hole 18 but the short cylindrical convexity 17 and the engagement hole 18 tend to disengage as depicted in FIG. 9B. Whichever the case may be, the holes 14 formed through the flat plate portions 11 and the holes 15 formed through the support plate portion 13 do not remain aligned, thereby making it impossible to insert the rivets 7 through the holes 14,15 (see FIGS. 3 to 4). Where the concave-convex engagement between the short cylindrical convexities 17 and their corresponding engagement holes 18 is not achieved or is released, it is necessary to press the flat plate portions 11 toward the support plate portion 13 to cause the short cylindrical convexities 17 to fit again in their corresponding engagement holes 18 and then to perform the insertion of the rivets 7. The efficiency of the assembly work of the air bag module is hence lowered.

If the thickness of the mounting plate portion 9 is increased, the flat plate portions 11 can be provided with sufficiently high stiffness so that the above-described concave-convex engagement can be achieved surely. This approach however develops a new problem as will be described next. First, the material cost and the weight increase in proportion to an increase in the thickness of the mounting plate portion 9. Second, a greater thickness tends to develop a deformation generally called "sinking" or a "sink mark", thereby making it difficult to assure the dimensional and configurational accuracy of the mounting plate portion 9.

In the case of the mounting plate portion 9 free of any indentations as illustrated in FIG. 8, on the other hand, the mounting plate portion 9 is provided with sufficient stiffness. To such an extent that the inner peripheral wall of the mounting plate portion 9 is pushed by the outer peripheral edges of the air bag 4, the once-fitted short cylindrical convexities 17 do not slip out of the corresponding engagement holes 18. It is therefore possible to avoid a reduction in the efficiency of assembly work due to such a cause as described above. In the case of the mounting plate portion 9 free of such indentations, however, the stiffness is so high that the mounting plate portion 9 does not undergo sufficient deformation. As a consequence, the work to align the short cylindrical convexities 17 with the engagement holes 18 cannot be performed easily.

To align the short cylindrical convexities 17 with their corresponding engagement holes 18, the mounting plate portion 9 has to be elastically deformed outwardly so that the short cylindrical convexities 17 are caused to ride on the support plate portion 13. In the case of the shape shown in FIG. 8, however, the stiffness of the mounting plate portion 9 is too high so that substantial force is required to elastically deform the mounting plate portion 9. As a result, the work to bring the short cylindrical convexities 17 and their corresponding engagement holes 18 into concave-convex engagement becomes irksome so that the efficiency of the assembly work of the air bag module is also lowered.

SUMMARY OF THE INVENTION

Since such a reduction in the efficiency of the assembly work of an air bag module becomes a cause for an increase in the manufacturing cost of the air bag module, an improvement is desired. With the these circumstances in view, the present inventor has proceeded with an extensive investigation, leading to the completion of the present invention.

In one aspect of the present invention, there is thus provided an air bag module comprising:

(a) a housing for being mounted on a vehicle body, said housing having a base plate portion and a support plate portion bent down from said base plate portion, said support plate portion being provided with first concave portions or first convex portions; and (b) a cover fixedly secured on said housing, said cover having:
- a cover portion having dimensions sufficient to cover said base plate portion of said housing,
- a substantially-cylindrical mounting plate portion extending from said cover portion toward said housing and located outside said support plate portion,
- second convex portions or second concave portions maintained in engagement with said first concave portions or said first convex portions, respectively, said second convex portions or said second concave portions being formed on or in said mounting plate portion and being located on a single plane extending across a direction in which said cylindrical mounting plate portion extends, and
- indentations formed in said mounting plate portion at plural locations spaced from each other in a peripheral direction of said mounting plate portion, deepest portions of said indentations being substantially coincided with said single plane.

In the air bag module according to the present invention, the mounting plate portion has an adequate degree of bending stiffness owing to the provision of the plural indentations having the depth set in the specific positional relationship with the second convex portions or second concave portions formed on or in the mounting plate portion. As a result, the work to bring the second convex portions or second concave portions formed on or in the mounting plate portion into engagement with their corresponding first concave portions or first convex portions formed in or on the support plate portion can be facilitated and, once they are brought into engagement, they are resistant to unintentional disengagement.

The assembly work of the air bag system can therefore be performed efficiently, leading to a reduction in the manufacturing cost of the air bag system.

BRIEF DESCRIPTION OF THE DRAWINGS

FIG. 1 is a perspective view of a cover of an air bag module according to a first embodiment of the present invention, as viewed from an inner wall side;

FIG. 6 is similar to FIG. 1 but illustrates one conventional example of a mounting plate portion of a cover;

DETAILED DESCRIPTION OF THE INVENTION AND PREFERRED EMBODIMENTS

Figure 2A:
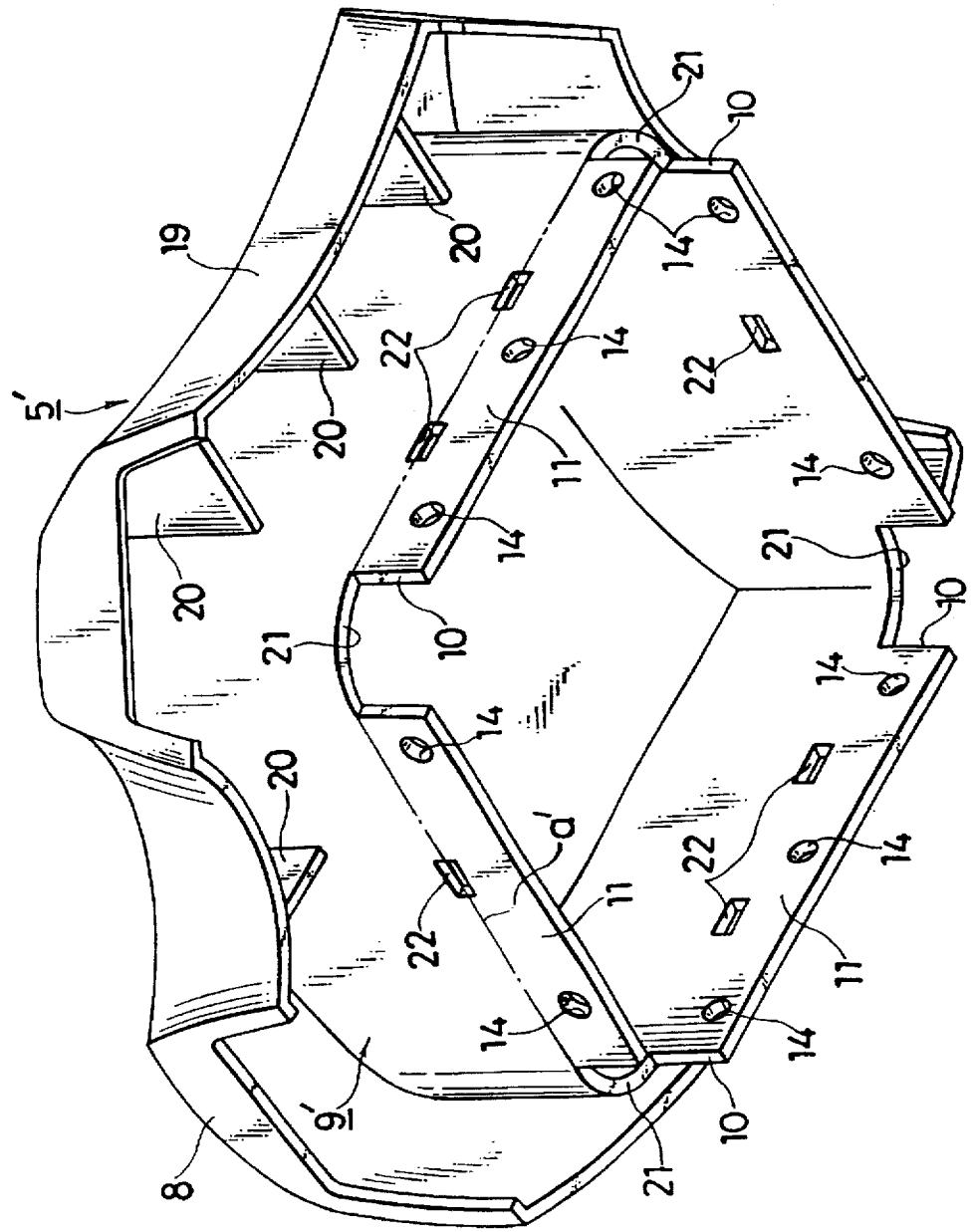
FIG. 2A is similar to FIG. 1 but shows a second embodiment according to the present invention.

The air bag module according to the first embodiment of the present invention will first be described with reference to FIG. 1. A cover 5—which has been molded as an integral unit by injection molding or the like from a relatively soft material having elasticity, for example, a synthetic resin such as polyvinyl chloride—has a cover portion 8 of dimensions sufficient to cover the housing 2 (see FIG. 2) and a mounting plate portion 9 in the form of a rectangular cylinder arranged extending from an inner wall of the cover portion 8. The inner wall of the cover portion 8 is the wall to be positioned opposite a steering wheel in which the air bag module is installed. A peripheral edge portion of the cover portion 8 forms a curved portion 19 which is bent toward the inner wall. Formed between the curved portion 19 and an outer peripheral wall of the mounting plate portion 9 are reinforcement ribs 20.

Through the mounting plate portion 9, plural holes 14 (ten holes in the illustrated embodiment) are formed. In the illustrate embodiment, the positions where the plural holes 14 are formed lie on a single plane which is surrounded by an alternate long and short dash line a in FIG. 1 and extends across a direction in which the mounting plate portion 9 extends in the form of a cylinder. It is however to be noted that the positions of these holes 14 are not necessarily required to lie on the single plane surrounded by the alternate long and short dash line a. If the positions of the individual holes 14 differ from each other, the positions of the holes 15 formed in the housing 2 and those of the holes 16 in a holding plates 6 must be changed to make the holes 16 align with the corresponding holes 14. Whichever the case may be, these plural holes 14 are brought into alignment with their corresponding holes 15 formed in the support plate portions 13 of the housing 2 and also with their corresponding holes 16 of the holding plates 6 upon assembly of the air bag module. Rivets 7 (see FIGS. 3 and 4) are inserted through the holes 14,15,16 and are then clinched or crimped. On an inner peripheral wall of the mounting plate portion 9, short cylindrical convexities 17—which form concave-convex engagement portions in combination with the circular engagement holes 18 formed through the support plate portion 13 (see FIGS. 3 and 4)—are formed between the adjacent holes 14. These short cylindrical convexities 17 are located on the single plane surrounded by the above-described, alternate long and short dash line a.

In the cover of the air bag module according to the present invention, indentations 10 are formed in four corner portions of the mounting plate portion 9 in the form of the rectangular cylinder. These indentations 10 are open at free end edges of the mounting plate portion 9. A deepest edge 21 of each indentation 10 is located approximately on the single plane surrounded by the alternate long and short dash line a.

In the cover of the air bag module according to the present invention, said cover having been constructed as described above, the mounting plate portion 9 has an adequate level of bending stiffness owing to the provision of the plural indentations 10 having the depth set in the specific positional relationship with the short cylindrical convexities 17 which establish concave-convex engagement with the corresponding engagement holes 18. As a consequence, the work to establish the concave-convex engagement between the inner peripheral wall of the mounting plate portion 9 and the outer peripheral wall of the support plate portion 13 is facilitated and moreover, the once-established concave-convex engagement is resistant to disengagement.

Compared with the situation that the indentations 10 are omitted, the flat plate portions 11 located between the adjacent indentations 10 have somewhat smaller stiffness, thereby making it easier to cause the short cylindrical convexities 17, whose half portions (lower half portions as viewed in FIG. 1) are located on the corresponding flat plate portions 11, to ride on the support plate portion 13 of the housing 2. As a consequence, the work to bring these short cylindrical convexities 17 and their corresponding engagement holes (see FIGS. 3 to 4) into engagement to establish concave-convex engagement can be performed with ease.

It is to be noted that the other half portions (the upper half portions as viewed in FIG. 1) of the short cylindrical convexities 17 are located on an indentation-free and high-stiffness part of the mounting plate portion 9. Accordingly, these other half portions are resistant to outward displacement. As a consequence, once the individual short cylindrical convexities 17 have been brought into engagement with the engagement holes 18, these short cylindrical convexities 17 are resistant to disengagement from the engagement holes 18. To such an extent as being pushed by the air bag 5, the engagement of the respective short cylindrical convexities 17 and their corresponding engagement holes 18 is not released. This makes it possible to easily and efficiently perform the work to align the individual holes 14–16 and then to insert the rivets 7 through the these holes 14–16.

Figure 2B:
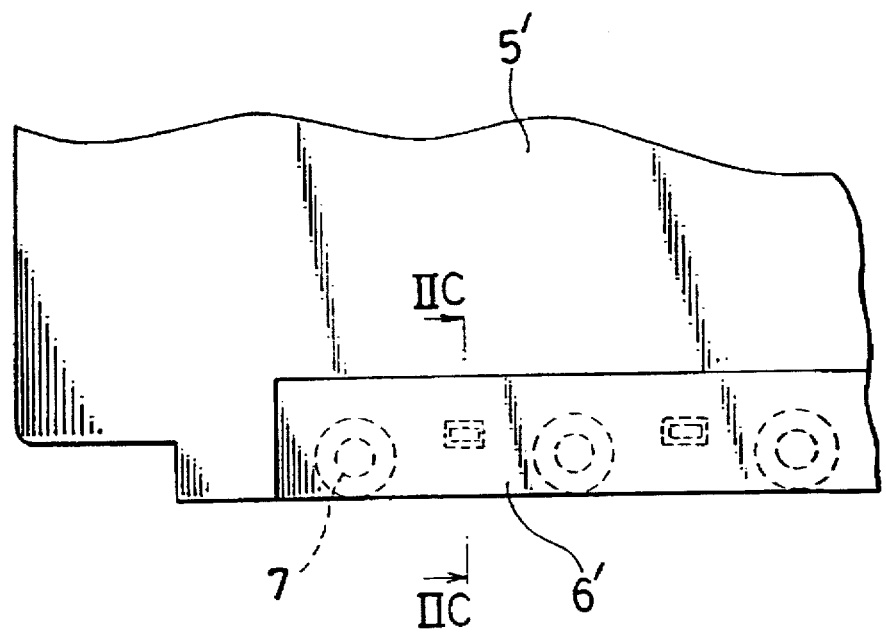
FIG. 2B is a fragmentary front view showing the air bag module according to the second embodiment of the present invention in an assembled form.
Figure 2C:
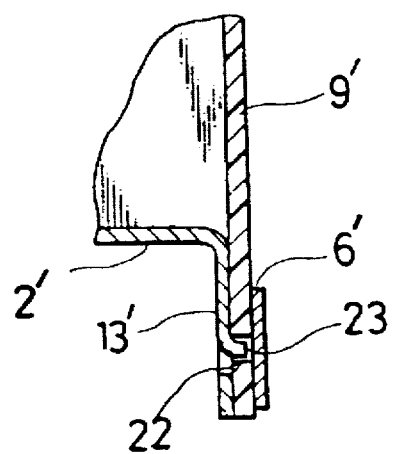
FIG. 2C is a fragmentary cross-sectional view taken in the direction of arrows IIC—IIC of FIG. 2B.

Referring next to FIGS. 2A through 2C, the second embodiment of the present invention will be described. Since concave-convex engagement is established with a support plate portion 13' of a housing 2 in the second embodiment, rectangular engagement holes 22 are formed in a part of a mounting plate portion 9' at locations between but higher than adjacent holes 14. These engagement holes 22 are located on a single plane indicated by an alternate long and short dash line a' in FIG. 2A. In this embodiment, the individual holes 14 are located on a side biased from the single plane toward a free edge of the cover mounting plate portion 9'.

To establish concave-convex engagement with the individual engagement holes 22, rectangular engagement convexities 23 are formed on an outer peripheral wall of the support plate portion 13'. These engagement convexities 23 have been formed, for example, by forming turned square U-shaped slits in parts of the support plate portion 13' and then bending the insides of the slits out to the side of the external peripheral wall of the support plate portion 13'. Incidentally, the structure of the concave-convex engagement portions, which consist of the engagement convexities 23 formed on the side of the support plate portion 13' and the engagement holes 22 formed on the side of the mounting plate portion 9', are conventionally known as disclosed in U.S. Pat. No. 5,167,427 referred to above. Further, the structure of the concave-convex engagement portions is by itself not an essential feature of the present invention. Its detailed description is therefore omitted herein.

A characteristic feature of the second embodiment resides in the reversal of the places, where the concavities and convexities are formed to provide concave engagement portions and convex engagement portions, respectively, from the first embodiment. Namely, the engagement holes 22 are formed on the side of the cover 5' whereas the convexities 23 are formed on the side of the housing 2'. The remaining construction and functions are similar to the first embodiment, so that like elements of structure are identified by like reference numerals and an overlapping description is omitted.

Figure 3:
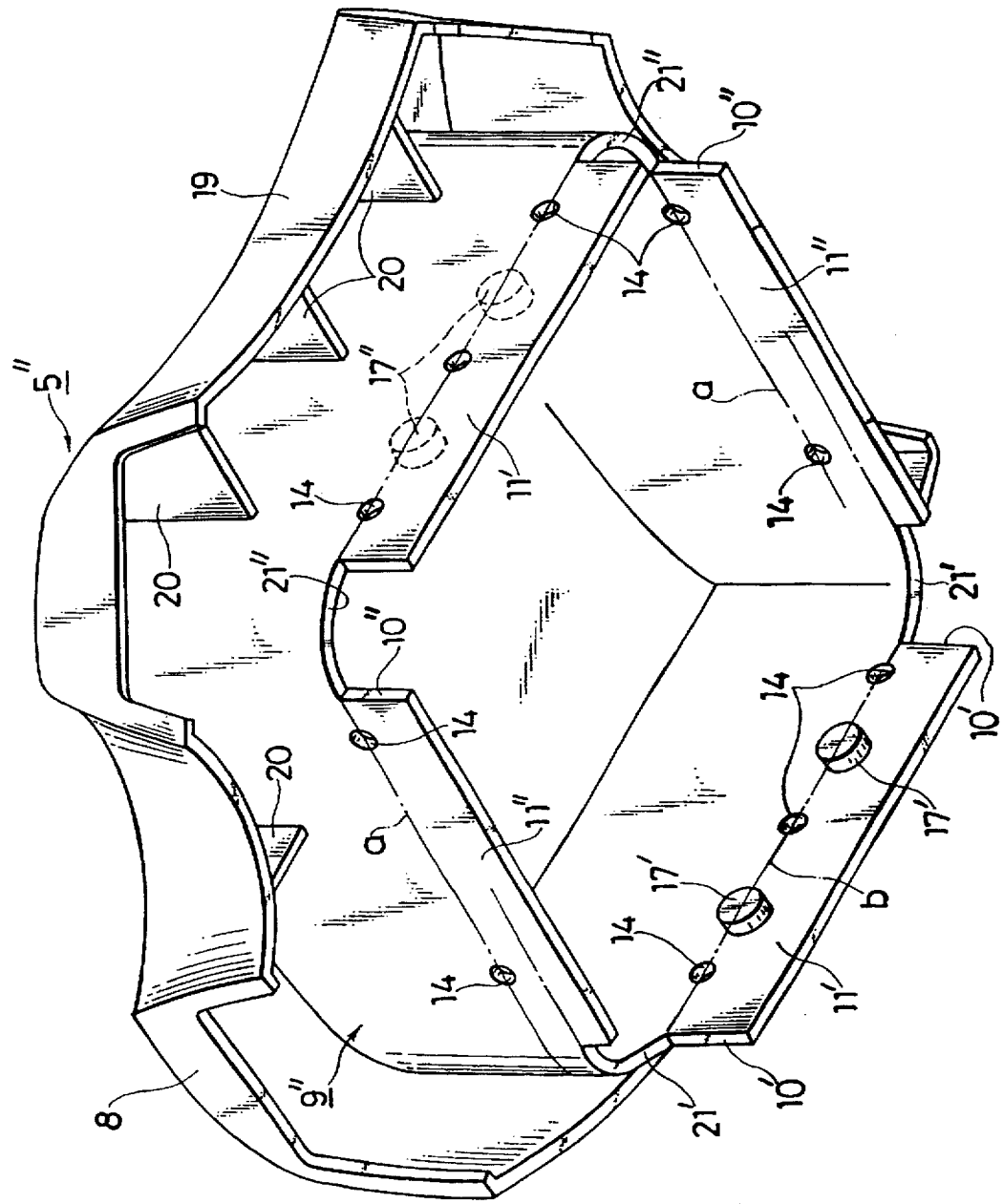
FIG. 3 is similar to FIG. 1 but depicts a third embodiment of the present invention.

Reference is now had to FIG. 3 in which the third embodiment of the present invention is illustrated. In this embodiment, short cylindrical convexities 17',17" which establish concave-convex engagement are formed on only a pair of mutually-opposing sides (i.e., flat plate portions 11') of a mounting plate portion 9'" approximately in the form of rectangular cylinder. The remaining pair of mutually-opposing sides 11" are provided with holes 14 alone and no convexities are formed there.

These short cylindrical convexities 17' and 17" are shifted in phase or level in a direction in which the cylindrical mounting plate portion 9'" extends. Namely, the short cylindrical convexities 17' are located farther from the cover portion 8 of the cover 5" than the short cylindrical convexities 17".

Further, indentations 10',10" are formed in individual corner portions of the rectangular-cylinder-shaped mounting plate portion 9'", respectively. Deepest edges 21' of the indentations 10' are located on a plane b in which the short cylindrical convexities 17' are contained, while deepest edges 21" of the indentations 10" are located on a plane a in which the short cylindrical convexities 17" are contained.

Figure 4:
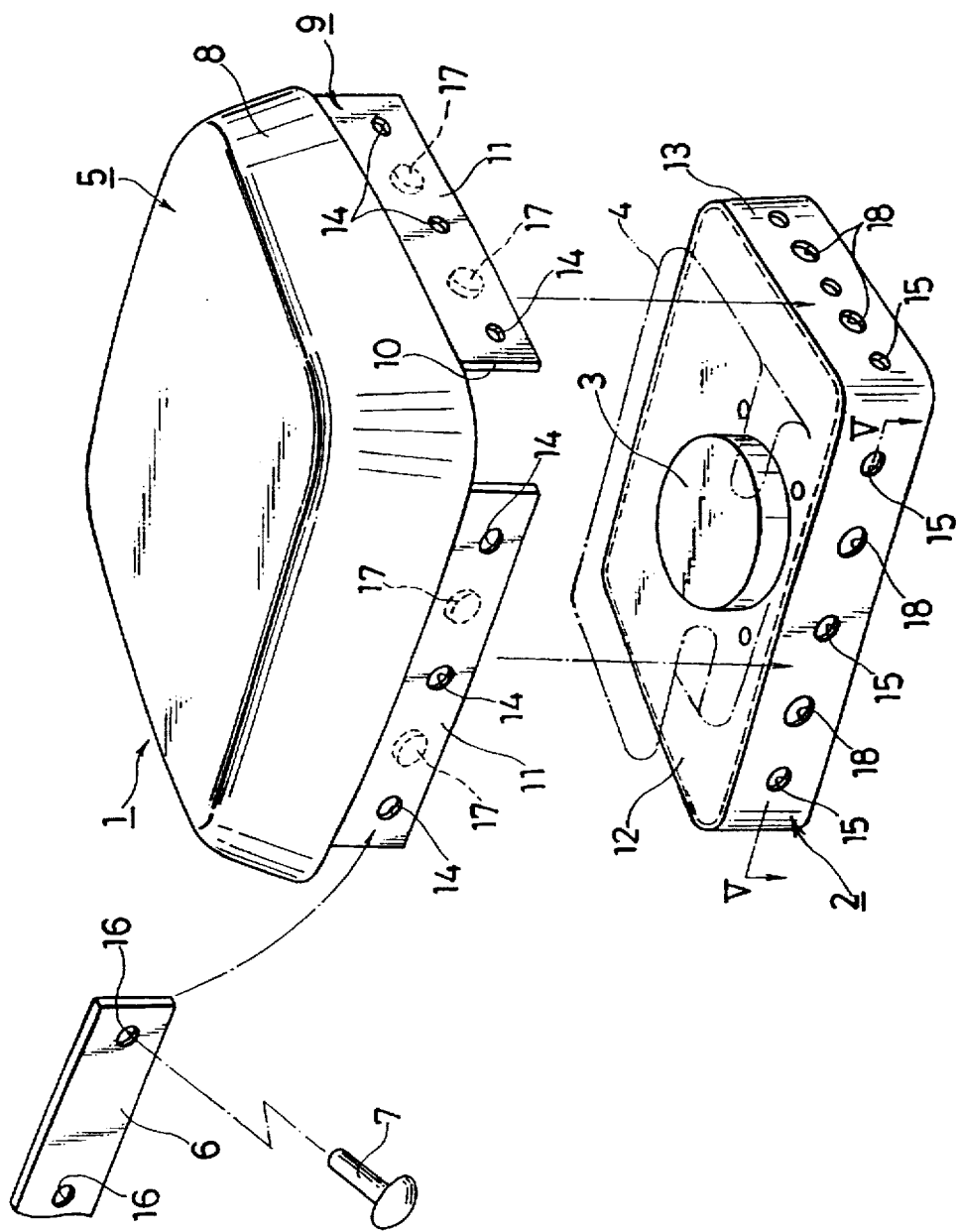
FIG. 4 is an exploded perspective view of a conventional air bag module, showing one example of conventional constructions.
Figure 5:
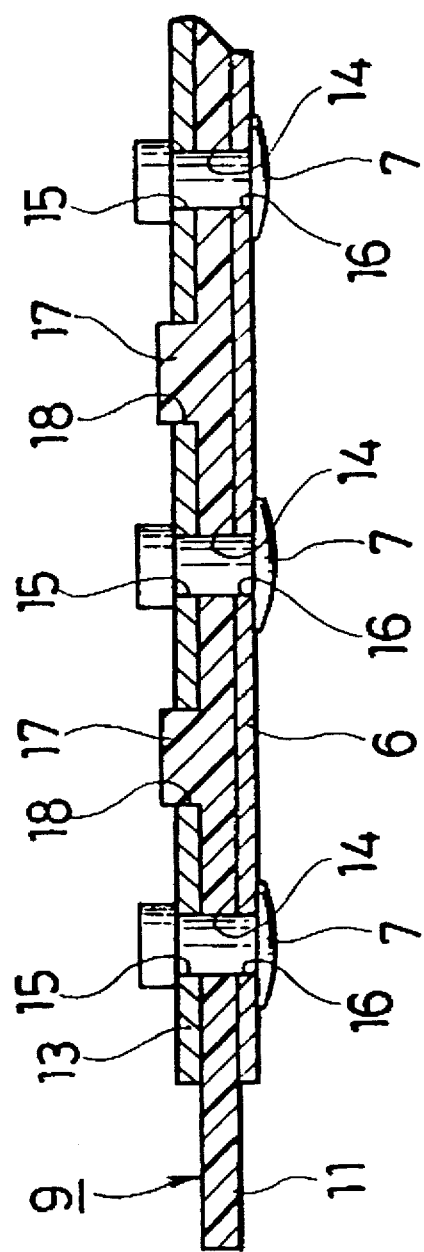
FIG. 5 is an enlarged fragmentary cross-sectional view taken in the direction of arrows V—V of FIG. 4, in which the air bag module is shown in an assembled form.
Figure 7A:
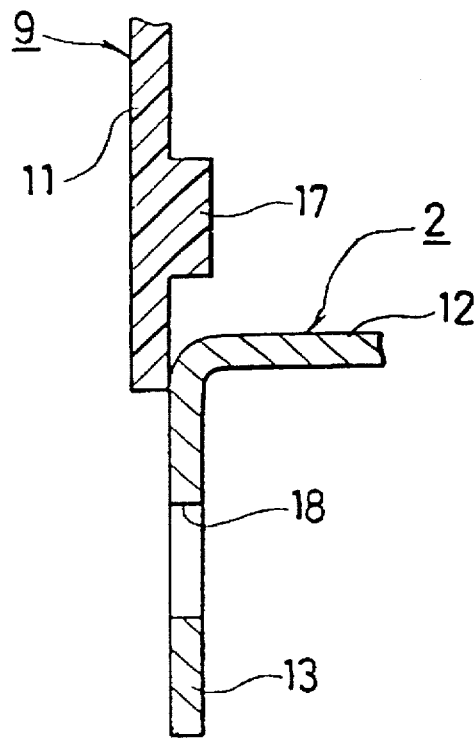
FIGS. 7A and 7B are fragmentary cross-sectional views taken in the direction of arrows VIIA,B—VIIA,B in FIG. 6, illustrating procedures for joining a mounting plate portion with a support plate portion.
Figure 7B:
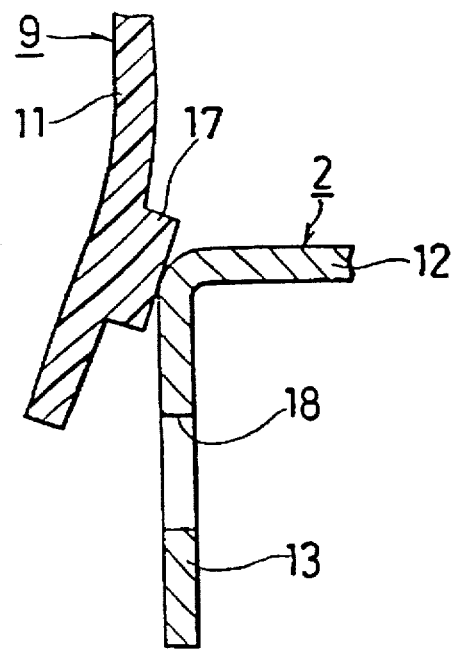
Figure 8:
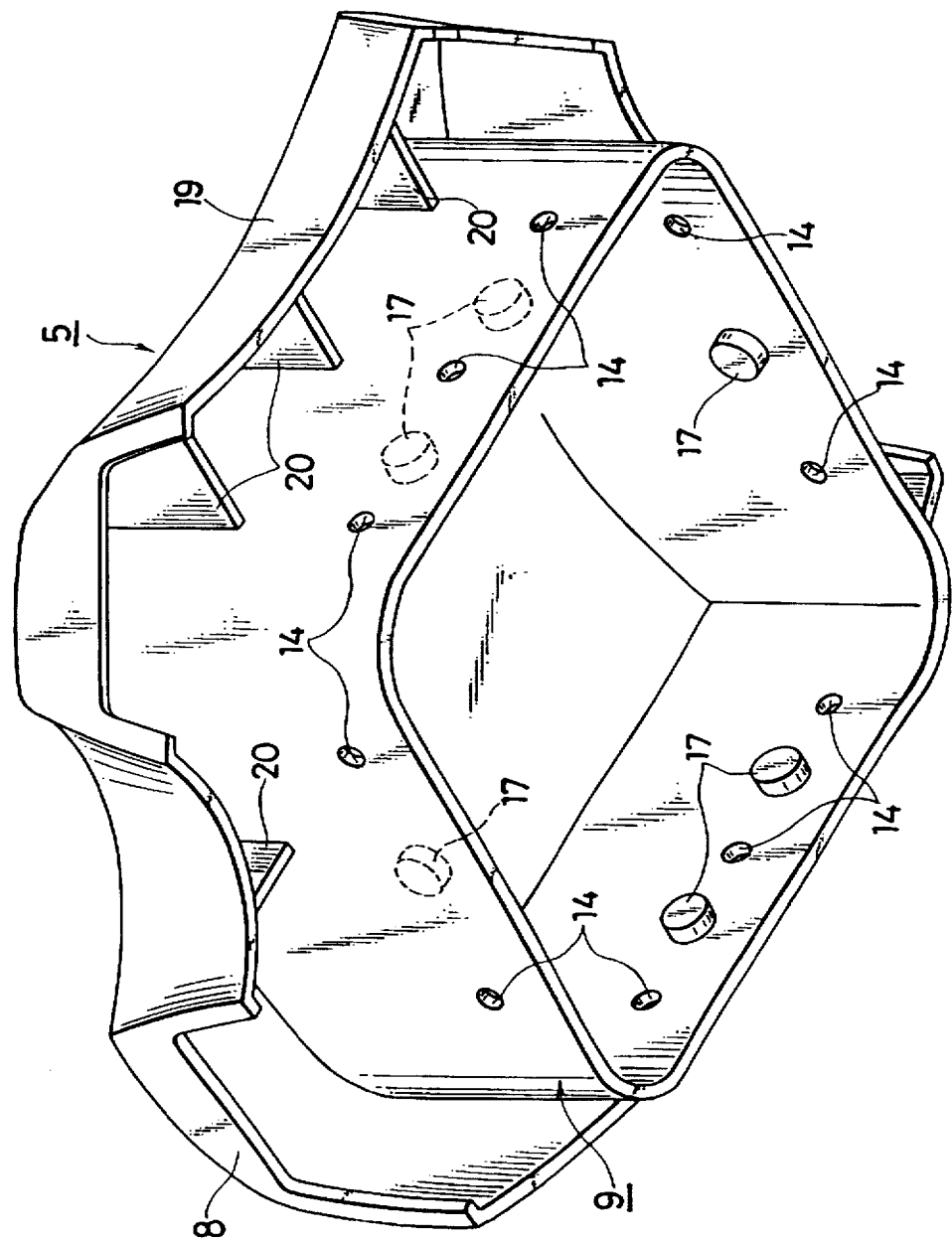
FIG. 8 is similar to FIG. 1 but shows a second conventional example of a mounting plate portion of a cover.
Figure 9A:
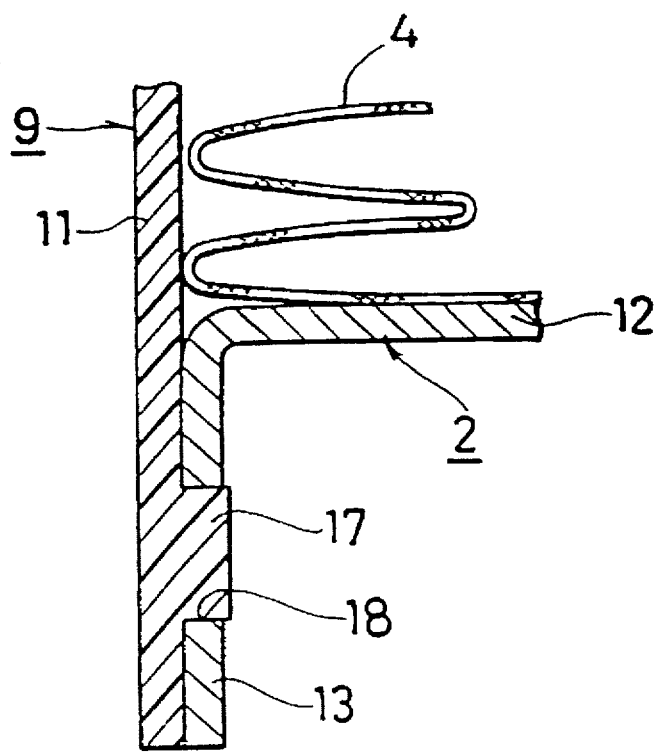
FIGS. 9A and 9B are fragmentary cross-sectional views showing the state of assembly of a mounting plate portion of a cover for an air bag module where the stiffness of the mounting plate portion is too high and the state of assembly of the mounting plate portion where the stiffness of the mounting plate portion is too low, respectively.
Figure 9B:
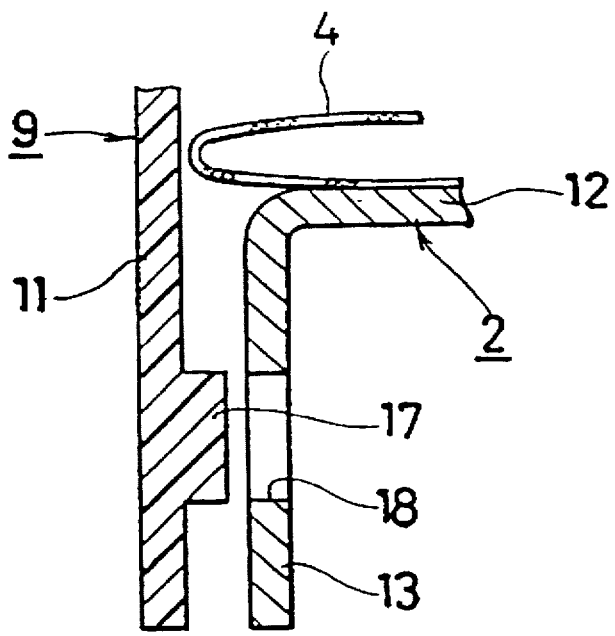

As illustrated in FIG. 4, engagement holes are formed in the housing at locations opposing the short cylindrical convexities 17',17", respectively, to form concave-convex engagement portions. Illustration of these engagement holes in a drawing is however omitted.

Characteristic features of the third embodiment reside in that the concave-convex engagement portions are arranged in two groups shifted in phase or level in the direction of extension of the cylindrical mounting plate portion 9'" and that the deepest edges of the indentations are substantially coincided with the corresponding single planes b,a in which their adjacent convex-concave engagement portions are contained, respectively. The remaining construction and functions are similar to the first embodiment.

Even if a cover-mounting portion does not have the same length when viewed along its periphery, in other words, has a longer or shorter part than the remaining part when viewed along its periphery, the third embodiment permits easy matching, namely, mounting of the air bag module on a steering wheel and after mounting, provides sufficient securement strength.

What is claimed is:

1. An air bag module comprising:
   (a) a housing for being mounted on a vehicle body, said housing having a base plate portion and a support plate portion bent down from said base plate portion, said support plate portion being provided with first engagement portions; and
   (b) a cover fixedly secured on said housing, said cover having:
      a cover portion having dimensions sufficient to cover said base plate portion of said housing,
      a mounting plate portion extending from said cover portion and located outside said support plate portion,
      second engagement portions maintained in engagement with said first engagement portions, said second engagement portions being formed at said mounting plate portion and being divided into two groups shifted in phase in a direction in which said mounting plate portion extends, said second engagement portions in one of the groups and said second engagement portions in the other group being located on single planes, respectively, and said single planes extending across the direction in which said mounting plate portion extends, and first and second indentations formed in said mounting plate portion at plural locations spaced from each other in a peripheral direction of said mounting plate portion, deepest portions of said first and second indentations being substantially coincided with said single planes, respectively;

wherein said first engagement portions are divided in two groups shifted in phase in a direction in which said support plate portion extends so that, upon assembling said cover with said housing, said first engagement portions in the two groups are brought into engagement with said second engagement portions in the two groups, respectively.

2. An air bag module according to claim 1, wherein said mounting plate portion is in the form of a rectangular cylinder and has four faces connected together via corner portions, and said first and second indentations are formed in the individual corner portions of said mounting plate portion; and said support plate portion has a complementary shape with said mounting plate portion and has four faces.

3. An air bag module according to claim 2, wherein said second engagement portions are formed at only a pair of mutually opposing ones of said four faces of said mounting plate portion; and said first engagement portions are formed at only a pair of mutually opposing ones of said four faces of said support plate portion.

4. An air bag module according to claim 1, wherein said first engagement portions are concave and said second engagement portions are convex.

5. An air bag module according to claim 1, wherein said first engagement portions are convex and said second engagement portions are concave.

* * * * *